(12) United States Patent
Lin et al.

(10) Patent No.: US 12,704,604 B2
(45) Date of Patent: Aug. 11, 2026

(54) LIDAR DEVICE INCLUDING A LOCAL OSCILLATOR NETWORK

(71) Applicant: Aurora Operations, Inc., Pittsburgh, PA (US)

(72) Inventors: Sen Lin, Santa Clara, CA (US); Andrew Steil Michaels, Santa Clara, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 1066 days.

(21) Appl. No.: 17/845,948

(22) Filed: Jun. 21, 2022

(65) Prior Publication Data

US 2024/0094350 A1 Mar. 21, 2024

(51) Int. Cl.

| | |
|---|---|
| ***G01S 7/481*** | (2006.01) |
| ***G01S 7/4914*** | (2020.01) |
| ***G01S 7/497*** | (2006.01) |
| ***G01S 17/34*** | (2020.01) |
| ***G01S 17/931*** | (2020.01) |

(52) U.S. Cl.

CPC ........... *G01S 7/4817* (2013.01); *G01S 7/4811* (2013.01); *G01S 7/4914* (2013.01); *G01S 7/497* (2013.01); *G01S 17/34* (2020.01); *G01S 17/931* (2020.01)

(58) Field of Classification Search

CPC .... G01S 7/4817; G01S 7/4811; G01S 7/4914; G01S 7/497; G01S 17/34; G01S 17/931; G01S 7/4917; G01S 7/499; G01S 17/42

See application file for complete search history.

(56) References Cited

U.S. PATENT DOCUMENTS

| | | | |
|---|---|---|---|
| 8,988,754 | B2 | 3/2015 | Sun et al. |
| 9,476,981 | B2 | 10/2016 | Yaacobi et al. |
| 10,008,772 | B2 | 6/2018 | Mayo |
| 10,338,321 | B2 | 7/2019 | Hosseini et al. |
| 10,627,517 | B2 | 4/2020 | Yaacobi et al. |
| 10,761,272 | B2 | 9/2020 | Hosseini et al. |
| 11,150,411 | B2 | 10/2021 | Hosseini et al. |

(Continued)

FOREIGN PATENT DOCUMENTS

| | | |
|---|---|---|
| WO | 2019217860 A1 | 11/2019 |

OTHER PUBLICATIONS

Co-pending U.S. Appl. No. 17/842,699 inventors Sen Lin et al., filed Jun. 16, 2022.

(Continued)

*Primary Examiner* — Isam A Alsomiri
*Assistant Examiner* — Joseph C Fritchman
(74) *Attorney, Agent, or Firm* — Dority & Manning, P.A.

(57) ABSTRACT

A light detection and ranging (LIDAR) device may include a local oscillator network and one or more LIDAR pixels coupled to the local oscillator network. At least one of the one or more LIDAR pixels may include a transmit optical antenna, a receive optical antenna, and at least one receiver. The transmit optical antenna may be configured to emit a transmit beam. The receive optical antenna may be configured to detect a first polarization orientation of a return beam and a second polarization orientation of the return beam. The at least one receiver can be configured to receive at least one local oscillator signal from the local oscillator network. The at least one receiver can be configured to generate a signal based on the local oscillator signal and the return beam.

20 Claims, 9 Drawing Sheets

(56) References Cited

U.S. PATENT DOCUMENTS

| | | | | |
|---|---|---|---|---|
| 11,243,296 | B2 | 2/2022 | Byrd et al. | |
| 11,372,106 | B2 | 6/2022 | Yaacobi et al. | |
| 2014/0376001 | A1* | 12/2014 | Swanson | G01S 7/4817 356/479 |
| 2018/0172806 | A1 | 6/2018 | Marron | |
| 2018/0267250 | A1 | 9/2018 | Hosseini et al. | |
| 2021/0055694 | A1* | 2/2021 | Chan | G01S 7/4818 |
| 2021/0167778 | A1* | 6/2021 | Droz | H03K 17/969 |
| 2022/0003842 | A1 | 1/2022 | Wang et al. | |
| 2022/0003937 | A1 | 1/2022 | Hosseini et al. | |
| 2022/0050201 | A1 | 2/2022 | Sun et al. | |
| 2022/0196814 | A1 | 6/2022 | Lin et al. | |
| 2022/0320817 | A1* | 10/2022 | Eggermont | H01S 5/0428 |
| 2022/0357429 | A1* | 11/2022 | Seok | G01S 7/4816 |
| 2023/0366986 | A1* | 11/2023 | Islam | G01S 7/4816 |

OTHER PUBLICATIONS

Co-pending U.S. Appl. No. 17/848,167 inventors Sen Lin et al., filed Jun. 23, 2022.

* cited by examiner

LIDAR DEVICE INCLUDING A LOCAL OSCILLATOR NETWORK

BACKGROUND INFORMATION

Frequency Modulated Continuous Wave (FMCW) light detection and ranging (LIDAR) directly measures range and velocity of an object by transmitting a frequency modulated light beam and detecting a return signal. The automobile industry is currently developing autonomous features for controlling vehicles under certain circumstances. According to SAE International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to navigate through its environment.

BRIEF SUMMARY OF THE INVENTION

Implementations of the disclosure include a light detection and ranging (LIDAR) device. The LIDAR device may include a local oscillator network and one or more LIDAR pixels. The local oscillator network may be configured to provide a plurality of local oscillator signals in the LIDAR device. The one or more LIDAR pixels may be coupled to the local oscillator network. The at least one of the one or more LIDAR pixels may include a transmit optical antenna, a receive optical antenna, and at least one receiver. The transmit optical antenna may be configured to emit a transmit beam. The receive optical antenna may be configured to detect (i) a first polarization orientation of a return beam and (ii) a second polarization orientation of the return beam. The at least one receiver may be configured to generate at least one signal based on (i) the return beam and (ii) at least one of the plurality of local oscillator signals. The at least one signal can represent a distance to an object.

In an implementation, the at least one of the plurality of local oscillator signals may include a first local oscillator signal and a second local oscillator signal. The at least one receiver may include a first receiver configured to receive the first local oscillator signal, and the at least one receiver may include a second receiver configured to receive the second local oscillator signal.

In an implementation, the first local oscillator signal has the first polarization orientation and the second local oscillator signal has the second polarization orientation.

In an implementation, the at least one signal includes a first signal and a second signal. The first receiver can be configured to generate the first signal representing the return beam of the first polarization orientation, and the second receiver can be configured to generate the second signal representing the return beam of the second polarization orientation.

In an implementation, the first receiver may include a first optical mixer and a first diode pair configured to generate the first signal, and the second receiver may include a second optical mixer and a second diode pair configured to generate the second signal. The first signal and the second signal can be electrical signals.

In an implementation, the receive optical antenna can include a first single-polarization grating coupler and a second single-polarization grating coupler. The first single-polarization grating coupler may be configured to couple the first polarization orientation of the return beam to the at least one receiver. The second single-polarization grating coupler may be configured to couple the second polarization orientation of the return beam to the at least one receiver.

In an implementation, the transmit optical antenna may include a third single-polarization grating coupler configured to emit the transmit beam with the first polarization orientation. The first single-polarization grating coupler can be offset from the second single-polarization grating coupler, and the second single-polarization grating coupler can be offset from the third single-polarization grating coupler.

In an implementation, the first single-polarization grating coupler can be orthogonal to or can be rotated by approximately 90 degrees with respect to the second single-polarization grating coupler.

In an implementation, the local oscillator network may include a splitter configured to (i) receive a first local oscillator signal and (ii) provide the plurality of local oscillator signals to respective ones of the plurality of LIDAR pixels.

In an implementation, the local oscillator network can be configured to provide at least two of the plurality of local oscillator signals to each of the plurality of LIDAR pixels.

In an implementation, the LIDAR device may further include at least one passive splitter configured to couple a transmit signal to at least two of the one or more LIDAR pixels.

In an implementation, the LIDAR device may further include a plurality of power monitors. One of the plurality of power monitors can be coupled to the transmit optical antenna. One of the plurality of power monitors may include at least one photodiode that may be configured to generate an electrical output signal representative of a quantity of power of a transmit signal.

In an implementation, the at least one of the plurality of LIDAR pixels may further include an optical rotator configured to couple a transmit signal to the transmit optical antenna and configured to couple the return beam to the at least one receiver.

In an implementation, the transmit optical antenna can be positioned in a first semiconductor layer, and the receive optical antenna can be positioned in a second semiconductor layer that is stacked below the first semiconductor layer.

In an implementation, the first semiconductor layer includes a group III or a group V element, and the second semiconductor layer may be a nitride layer.

In an implementation, the first polarization orientation can be orthogonal to the second polarization orientation.

Implementations of the disclosure may include an autonomous vehicle control system for an autonomous vehicle. The autonomous vehicle control system may include a light detection and ranging (LIDAR) device. The LIDAR device may include a local oscillator network and one or more LIDAR pixels. The local oscillator network may be configured to provide a plurality of local oscillator signals in the LIDAR device. The one or more LIDAR pixels may be coupled to the local oscillator network. The at least one of the one or more LIDAR pixels may include a transmit optical antenna, a receive optical antenna, and at least one receiver. The transmit optical antenna may be configured to emit a transmit beam. The receive optical antenna may be configured to detect (i) a first polarization orientation of a return beam and (ii) a second polarization orientation of the return beam. The at least one receiver may be configured to generate at least one signal based on (i) the return beam and (ii) at least one of the plurality of local oscillator signals. The at least one signal can represent a distance to an object.

In an implementation, the receive optical antenna may include a first single-polarization grating coupler and a second single-polarization grating coupler. The first single-polarization grating coupler may be configured to couple the first polarization orientation of the return beam to the at least one receiver, and the second single-polarization grating coupler may be configured to couple the second polarization orientation of the return beam to the at least one receiver.

In an implementation, the transmit optical antenna can be positioned in a first semiconductor layer, and the receive optical antenna can be positioned in a second semiconductor layer that is stacked below the first semiconductor layer.

Implementations of the disclosure may include an autonomous vehicle. The autonomous vehicle may include a light detection and ranging (LIDAR) device. The LIDAR device may include a local oscillator network and one or more LIDAR pixels. The local oscillator network may be configured to provide a plurality of local oscillator signals in the LIDAR device. The one or more LIDAR pixels may be coupled to the local oscillator network. The at least one of the one or more LIDAR pixels may include a transmit optical antenna, a receive optical antenna, and at least one receiver. The transmit optical antenna may be configured to emit a transmit beam. The receive optical antenna may be configured to detect (i) a first polarization orientation of a return beam and (ii) a second polarization orientation of the return beam. The at least one receiver may be configured to generate at least one signal based on (i) the return beam and (ii) at least one of the plurality of local oscillator signals. The at least one signal can represent a distance to an object.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1A:
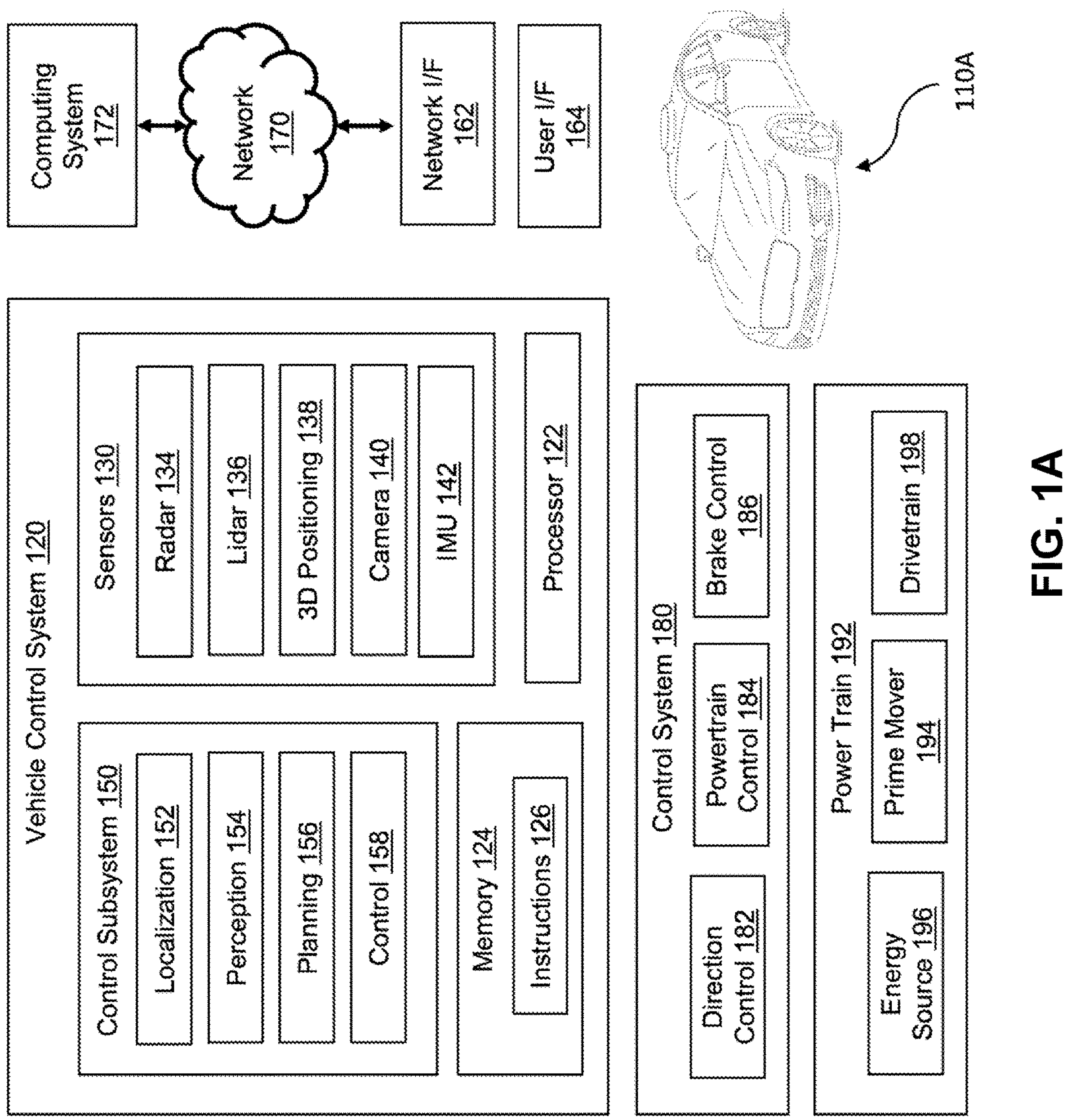
FIG. 1A illustrates a block diagram of an example of a system environment for autonomous vehicles, in accordance with implementations of the disclosure.

Implementations of a LIDAR device including a local oscillator network are described herein. In the following description, numerous specific details are set forth to provide a thorough understanding of the implementations. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification, several terms of art are used. These terms are to take on their ordinary meaning in the art from which they come, unless specifically defined herein or the context of their use would clearly suggest otherwise. For the purposes of this disclosure, the term "autonomous vehicle" includes vehicles with autonomous features at any level of autonomy of the SAE International standard J3016.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1600 nm.

Frequency Modulated Continuous Wave (FMCW) LIDAR directly measures range and velocity of an object/target by directing a frequency modulated light beam to an object or target. The light that is reflected from the object/target is combined with a tapped version of the light beam. The frequency of the resulting beat tone is proportional to the distance of the object from the LIDAR system once corrected for the doppler shift that requires a second measurement. The two measurements, which may or may not be performed at the same time, provide both range and velocity information.

Implementations of the disclosure include a LIDAR device that may include a local oscillator (LO) network coupled to provide local oscillator signals to an array of LIDAR pixels. A LIDAR pixel can include one or more modules, one or more integrated chips, or one or more electric circuits. In addition, a LIDAR pixel can be implemented as a single packaged chip or implemented as modular design such that a LIDAR pixel includes multiple packaged chips. The local oscillator network may be configured to split one or two local oscillator signals into one or two busses of local oscillator signals that are provided to the array of LIDAR pixels. The local oscillator network may include a number of optical splitters.

A LIDAR pixel may have a transmit optical antenna, a receive optical antenna, and at least one receiver (e.g., a first receiver and a second receiver). The receive optical antenna may be a dual-polarization optical receive antenna that detects two different polarizations of a returning beam (e.g., orthogonal polarization orientations). A first receiver may generate a first signal in response to receiving the first polarization orientation of the return beam detected by the receive optical antenna, and a second receiver may generate a second signal in response to receiving the second polarization orientation of the return beam detected by the receive optical antenna. Each receiver may receive an independent local oscillator signal to support generation of the first and second signals with less circuitry within the LIDAR pixel. Detecting two different polarization orientations of the return beam may increase the signal to noise (SNR) of the detected return beam and therefore increase the imaging quality of a LIDAR system. Additionally, detecting two different polarization orientations of the return beam may allow the LIDAR system to detect additional information about the external environment such as the polarization-dependent surface material of an object/target in the external environment of the LIDAR system.

The transmit optical antenna and receive optical antenna may be offset from each other to define a larger reception area for the return beam in the LIDAR pixel. The receive optical antenna may include a first single-polarization grating coupler and a second single-polarization grating coupler. The first single-polarization grating coupler may be offset from the second single-polarization grating coupler to enable receipt of the return beam from two locations slightly offset from the transmit optical antenna. The transmit optical antenna, the first single-polarization grating coupler, and the second single-polarization grating coupler may be aligned in one dimension, forming a line, to support pitch-catch operational characteristics of a LIDAR system. These and other implementations are described in more detail in connection with FIGS. 1A-5B.

1. System Environment for Autonomous Vehicles

FIG. 1A is a block diagram illustrating an example of a system environment for autonomous vehicles according to some implementations.

Referring to FIG. 1A, an example autonomous vehicle 110A within which the various techniques disclosed herein may be implemented. The vehicle 110A, for example, may include a powertrain 192 including a prime mover 194 powered by an energy source 196 and capable of providing power to a drivetrain 198, as well as a control system 180 including a direction control 182, a powertrain control 184, and a brake control 186. The vehicle 110A may be implemented as any number of different types of vehicles, including vehicles capable of transporting people and/or cargo, and capable of traveling in various environments, and it will be appreciated that the aforementioned components 180-198 can vary widely based upon the type of vehicle within which these components are utilized.

For simplicity, the implementations discussed hereinafter will focus on a wheeled land vehicle such as a car, van, truck, bus, etc. In such implementations, the prime mover 194 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 198 can include wheels and/or tires along with a transmission and/or any other mechanical drive components to convert the output of the prime mover 194 into vehicular motion, as well as one or more brakes configured to controllably stop or slow the vehicle 110A and direction or steering components suitable for controlling the trajectory of the vehicle 110A (e.g., a rack and pinion steering linkage enabling one or more wheels of the vehicle 110A to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 182 may include one or more actuators and/or sensors for controlling and receiving feedback from the direction or steering components to enable the vehicle 110A to follow a desired trajectory. The powertrain control 184 may be configured to control the output of the powertrain 192, e.g., to control the output power of the prime mover 194, to control a gear of a transmission in the drivetrain 198, etc., thereby controlling a speed and/or direction of the vehicle 110A. The brake control 186 may be configured to control one or more brakes that slow or stop vehicle 110A, e.g., disk or drum brakes coupled to the wheels of the vehicle.

Other vehicle types, including but not limited to off-road vehicles, all-terrain or tracked vehicles, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

Various levels of autonomous control over the vehicle 110A can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)")) and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. Sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 110A. Each sensor 130 can output sensor data at various data rates, which may be different than the data rates of other sensors 130.

The outputs of sensors 130 may be provided to a set of control subsystems 150, including, a localization subsystem 152, a planning subsystem 156, a perception subsystem 154, and a control subsystem 158. The localization subsystem 152 can perform functions such as precisely determining the location and orientation (also sometimes referred to as "pose") of the vehicle 110A within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 110A. A machine learning model can be utilized in tracking objects. The planning subsystem 156 can perform functions such as planning a trajectory for vehicle 110A over some timeframe given a desired destination as well as the static and moving objects within the environment. A machine learning can be utilized in planning a vehicle trajectory. The control subsystem 158 can perform functions such as generating suitable control signals for controlling the various controls in the vehicle control system 120 in order to implement the planned trajectory of the vehicle 110A. A machine learning model can be utilized to generate one or more signals to control an autonomous vehicle to implement the planned trajectory.

It will be appreciated that the collection of components illustrated in FIG. 1A for the vehicle control system 120 is merely exemplary in nature. Individual sensors may be omitted in some implementations. Additionally or alternatively, in some implementations, multiple sensors of types illustrated in FIG. 1A may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 110A may also include a secondary vehicle control system (not illustrated), which may be used as a redundant or backup control system for the vehicle 110A. The secondary vehicle control system may be capable of fully operating the autonomous vehicle 110A in the event of an adverse event in the vehicle control system 120, while in other implementations, the secondary vehicle control system may only have limited functionality, e.g., to perform a controlled stop of the vehicle 110A in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 110A, e.g., any cache memory in a processor, as well as any storage capacity used as a virtual memory, e.g., as stored on a mass storage device or another computer controller. One or more processors illustrated in FIG. 1A, or entirely separate processors, may be used to implement additional functionality in the vehicle 110A outside of the purposes of autonomous control, e.g., to control entertainment systems, to operate doors, lights, convenience features, etc.

In addition, for additional storage, the vehicle 110A may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 110A may include a user interface 164 to enable vehicle 110A to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 110A may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 110A receives environmental and other data for use in autonomous control thereof. Data collected by the one or more sensors 130 can be uploaded to a computing system 172 via the network 170 for additional processing. A time stamp can be added to each instance of vehicle data prior to uploading. Additional processing of autonomous vehicle data by computing system 172 in accordance with many implementations is described with respect to FIG. 2.

Each processor illustrated in FIG. 1A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 110A via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as “program code”. Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The environment illustrated in FIG. 1A is not intended to limit implementations disclosed herein. Indeed, other alternative hardware and/or software environments may be used without departing from the scope of implementations disclosed herein.

2. FM LIDAR for Automotive Applications

Figure 2:
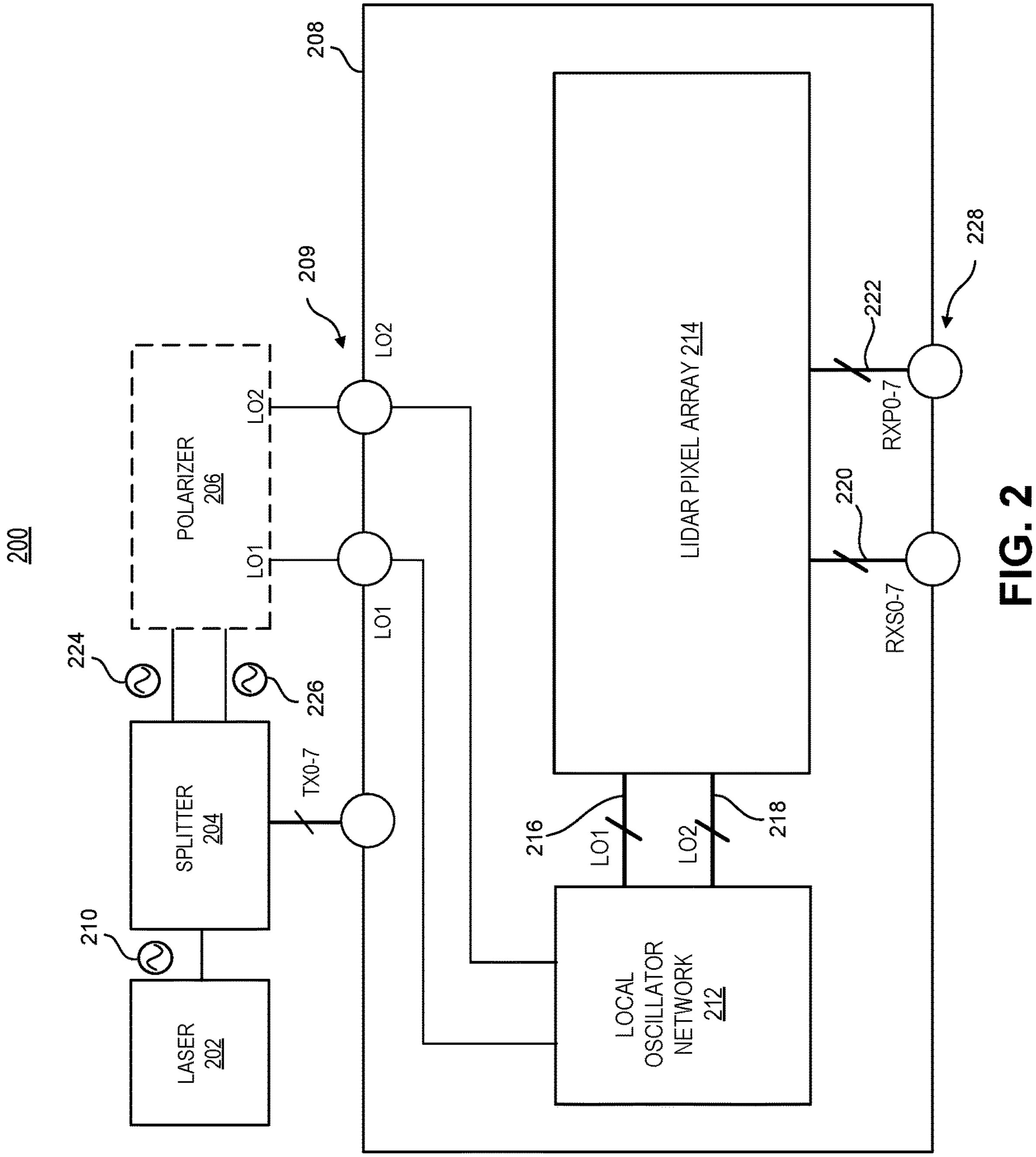
FIG. 2 illustrates a block diagram of a LIDAR system including a LIDAR transceiver, in accordance with implementations of the disclosure.
Figure 4:
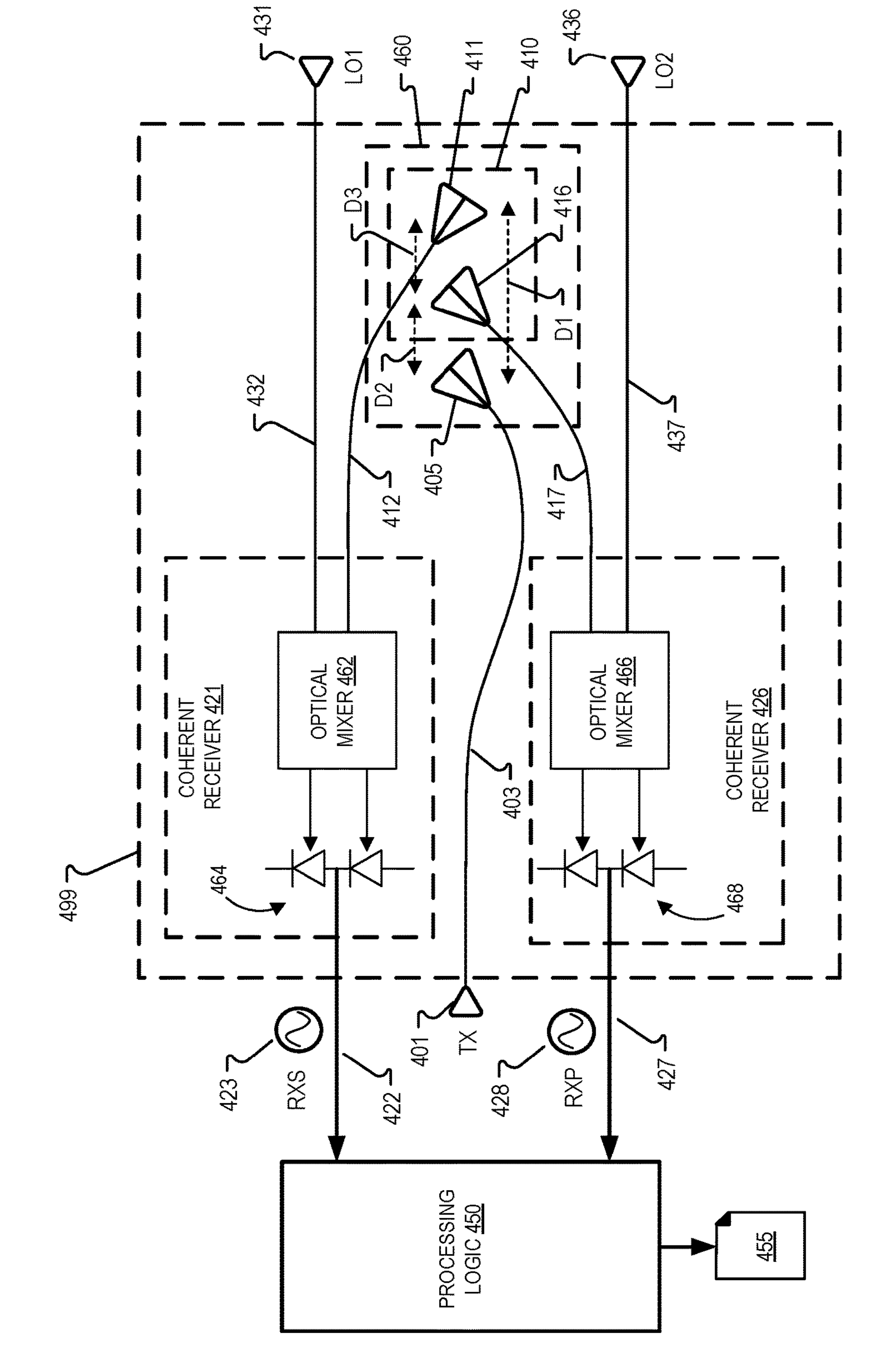
FIG. 4 illustrates a LIDAR pixel having a dual-polarization optical antenna, in accordance with implementations of the disclosure.

A truck can include a LIDAR system (e.g., vehicle control system 120 in FIG. 1A, LIDAR system 200 in FIG. 2, LIDAR system 400 in FIG. 4, etc.). In some implementations, the LIDAR system can use frequency modulation to encode an optical signal and scatter the encoded optical signal into free-space using optics. By detecting the frequency differences between the encoded optical signal and a returned signal reflected back from an object, the frequency modulated (FM) LIDAR system can determine the location of the object and/or precisely measure the velocity of the object using the Doppler effect. An FM LIDAR system may use a continuous wave (referred to as, “FMCW LIDAR” or “coherent FMCW LIDAR”) or a quasi-continuous wave (referred to as, “FMQW LIDAR”). The LIDAR system can use phase modulation (PM) to encode an optical signal and scatters the encoded optical signal into free-space using optics.

An FM or phase-modulated (PM) LIDAR system may provide substantial advantages over conventional LIDAR systems with respect to automotive and/or commercial trucking applications. To begin, in some instances, an object (e.g., a pedestrian wearing dark clothing) may have a low reflectivity, in that it only reflects back to the sensors (e.g., sensors 130 in FIG. 1A) of the FM or PM LIDAR system a low amount (e.g., 10% or less) of the light that hit the object. In other instances, an object (e.g., a shiny road sign) may have a high reflectivity (e.g., above 10%), in that it reflects back to the sensors of the FM LIDAR system a high amount of the light that hit the object.

Regardless of the object's reflectivity, an FM LIDAR system may be able to detect (e.g., classify, recognize, discover, etc.) the object at greater distances (e.g., 2×) than a conventional LIDAR system. For example, an FM LIDAR system may detect a low reflectivity object beyond 300 meters, and a high reflectivity object beyond 400 meters.

To achieve such improvements in detection capability, the FM LIDAR system may use sensors (e.g., sensors 130 in FIG. 1A). In some implementations, these sensors can be single photon sensitive, meaning that they can detect the smallest amount of light possible. While an FM LIDAR system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR system in infrared wavelengths, the FM or PM LIDAR system can broadcast stronger light pulses or light beams while meeting eye safety standards. Conventional LIDAR systems are often not single photon sensitive and/or only operate in near infrared wavelengths, requiring them to limit their light output (and distance detection capability) for eye safety reasons.

Thus, by detecting an object at greater distances, an FM LIDAR system may have more time to react to unexpected obstacles. Indeed, even a few milliseconds of extra time could improve safety and comfort, especially with heavy vehicles (e.g., commercial trucking vehicles) that are driving at highway speeds.

Another advantage of an FM LIDAR system is that it provides accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR system to determine distant or sparse data points as objects and/or track how those objects are moving over time. For example, an FM LIDAR sensor (e.g., sensors 130 in FIG. 1A) may only receive a few returns (e.g., hits) on an object that is 300 m away, but if those return give a velocity value of interest (e.g., moving towards the vehicle at >70 mph), then the FM LIDAR system and/or the autonomous vehicle control system may determine respective weights to probabilities associated with the objects.

Faster identification and/or tracking of the FM LIDAR system gives an autonomous vehicle control system more time to maneuver a vehicle. A better understanding of how fast objects are moving also allows the autonomous vehicle control system to plan a better reaction.

Another advantage of an FM LIDAR system is that it has less static compared to conventional LIDAR systems. That is, the conventional LIDAR systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR systems often need extra hardware, complex software, and/or more computational power to manage this "noise."

In contrast, FM LIDAR systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR systems produce (e.g., generates, derives, etc.) more accurate data with less hardware or software requirements, enabling safer and smoother driving.

Lastly, an FM LIDAR system is easier to scale than conventional LIDAR systems. As more self-driving vehicles (e.g., cars, commercial trucks, etc.) show up on the road, those powered by an FM LIDAR system likely will not have to contend with interference issues from sensor crosstalk. Furthermore, an FM LIDAR system uses less optical peak power than conventional LIDAR sensors. As such, some or all of the optical components for an FM LIDAR can be produced on a single chip, which produces its own benefits, as discussed herein.

3. Commercial Trucking

Figure 1B:
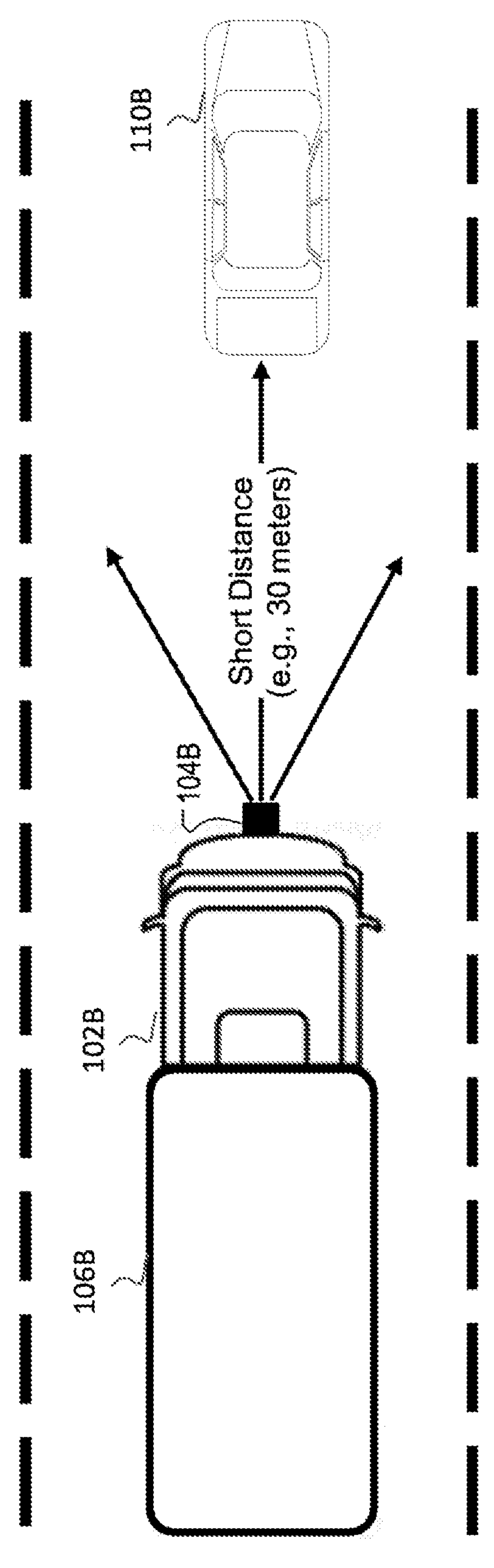
FIG. 1B illustrates a block diagram of an example of a system environment for autonomous commercial trucking vehicles, in accordance with implementations of the disclosure.

FIG. 1B is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. The commercial truck 102B may be a flatbed truck, a refrigerated truck (e.g., a reefer truck), a vented van (e.g., dry van), a moving truck, etc. The cargo 106B may be goods and/or produce. The commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 1B as another vehicle) that is within a distance range that is equal to or less than 30 meters from the truck.

The commercial truck 102B may include a LIDAR system 104B (e.g., an FM LIDAR system, vehicle control system 120 in FIG. 1A, LIDAR system 400 in FIG. 4, etc.) for determining a distance to the object 110B and/or measuring the velocity of the object 110B. Although FIG. 1B shows that one LIDAR system 104B is mounted on the front of the commercial truck 102B, the number of LIDAR system and the mounting area of the LIDAR system on the commercial truck are not limited to a particular number or a particular area. The commercial truck 102B may include any number of LIDAR systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR system 104B in environment 100B may be configured to detect an object (e.g., another vehicle, a bicycle, a tree, street signs, potholes, etc.) at short distances (e.g., 30 meters or less) from the commercial truck 102B.

Figure 1C:
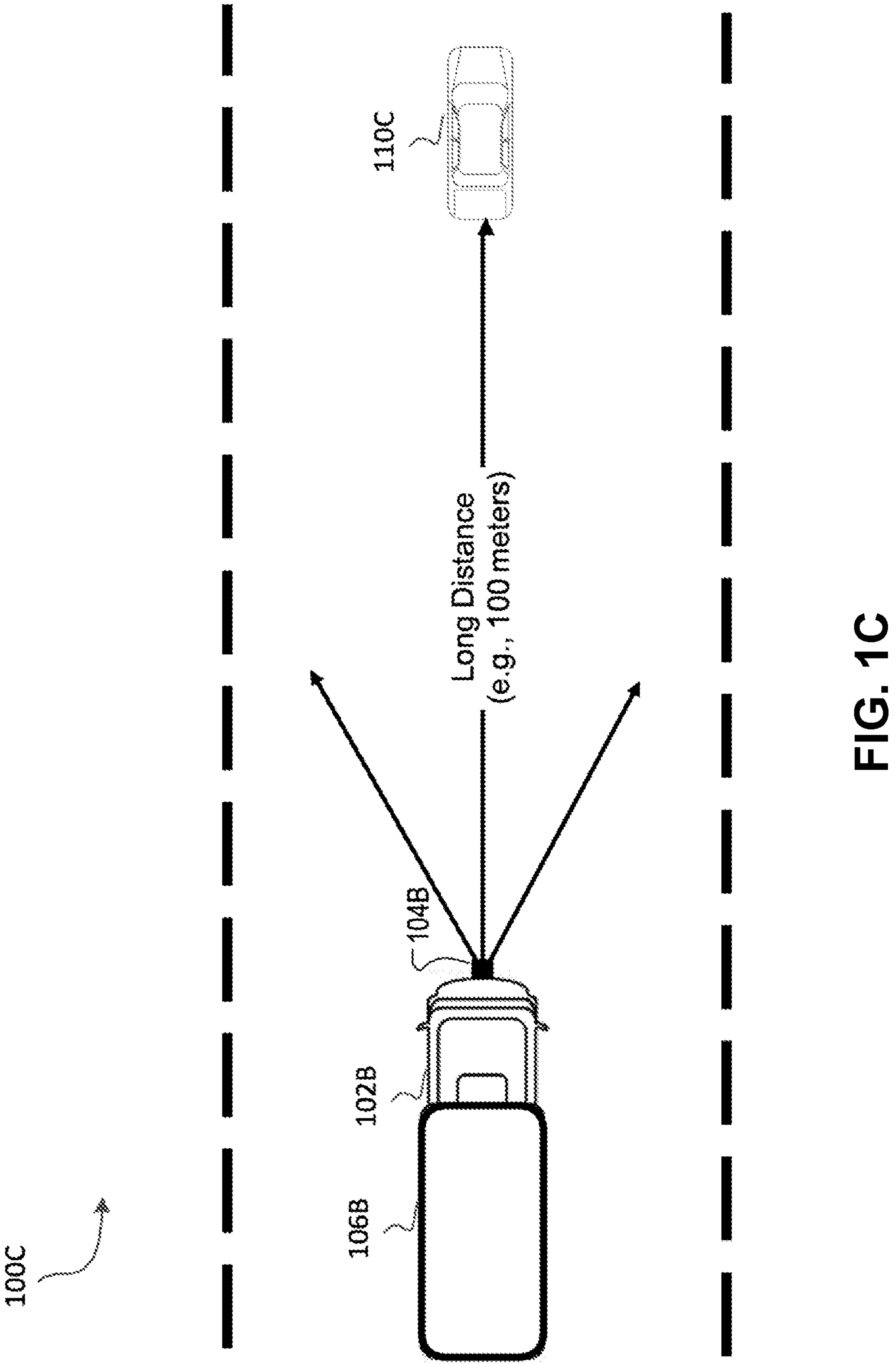
FIG. 1C illustrates a block diagram of an example of a system environment for autonomous commercial trucking vehicles, in accordance with implementations of the disclosure.

FIG. 1C is a block diagram illustrating an example of a system environment for autonomous commercial trucking vehicles, according to some implementations. The environment 100C includes the same components (e.g., commercial truck 102B, cargo 106B, LIDAR system 104B, etc.) that are included in environment 100B.

Figure 1D:
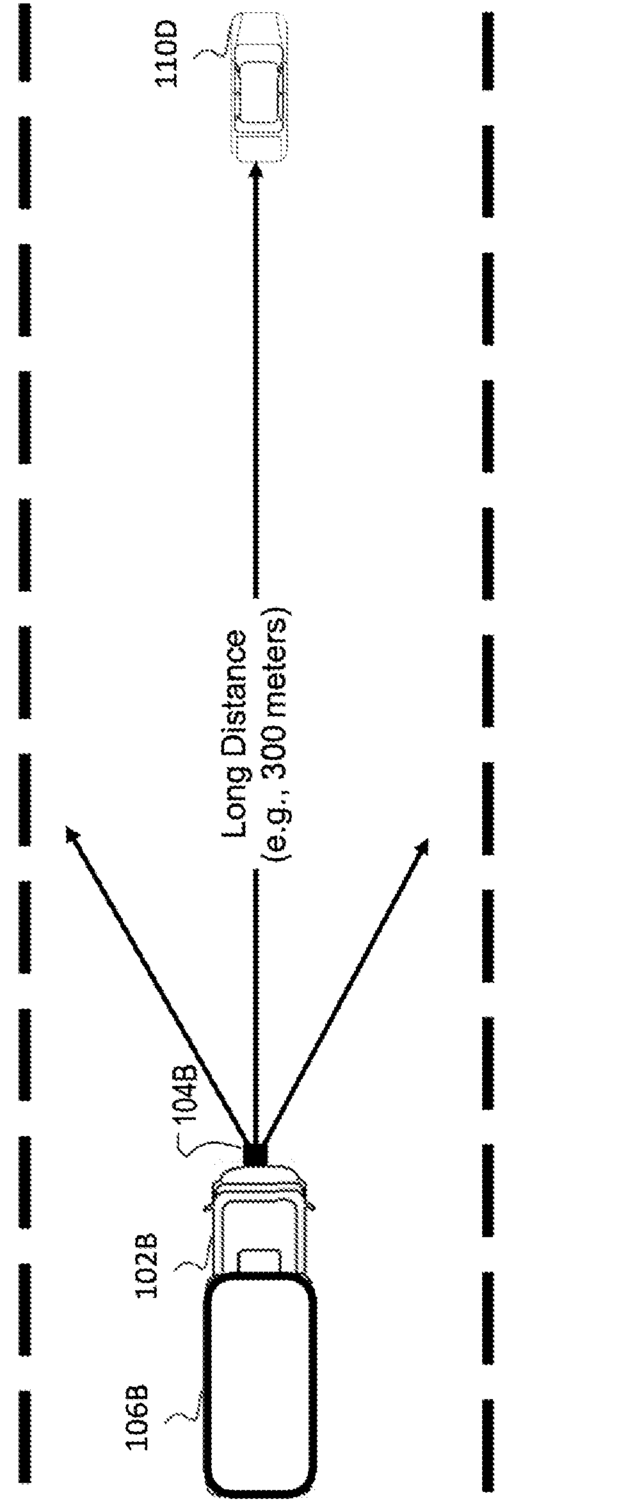
FIG. 1D illustrates a block diagram of an example of a system environment for autonomous commercial trucking vehicles, in accordance with implementations of the disclosure.

The environment 100C includes an object 110C (shown in FIG. 1C as another vehicle) that is within a distance range that is (i) more than 30 meters and (ii) equal to or less than 150 meters from the commercial truck 102B. As shown, the LIDAR system 104B in environment 100C may be configured to detect an object (e.g., another vehicle, a bicycle, a tree, street signs, potholes, etc.) at a distance (e.g., 100 meters) from the commercial truck 102B FIG. 1D is a block diagram illustrating an example of a system environment for autonomous commercial trucking vehicles, according to some implementations. The environment 100D includes the same components (e.g., commercial truck 102B, cargo 106B, LIDAR system 104B, etc.) that are included in environment 100B.

The environment 100D includes an object 110D (shown in FIG. 1D as another vehicle) that is within a distance range that is more than 150 meters from the commercial truck 102B. As shown, the LIDAR system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR systems (e.g., FMCW and/or FMQW systems) or PM LIDAR systems are well-suited for commercial trucking applications due to the advantages described above. As a result, commercial trucks equipped with such systems may have an enhanced ability to safely move both people and goods across short or long distances, improving the safety of not only the commercial truck but of the surrounding vehicles as well. In various implementations, such FM or PM LIDAR systems can be used in semi-autonomous applications, in which the commercial truck has a driver and some functions of the commercial truck are autonomously operated using the FM or PM LIDAR system, or fully autonomous applications, in which the commercial truck is operated entirely by the FM or LIDAR system, alone or in combination with other vehicle systems.

4. Continuous Wave Modulation and Quasi-Continuous Wave Modulation

In a LIDAR system that uses CW modulation, the modulator modulates the laser light continuously. For example, if a modulation cycle is 10 seconds, an input signal is modulated throughout the whole 10 seconds. Instead, in a LIDAR system that uses quasi-CW modulation, the modulator modulates the laser light to have both an active portion and an inactive portion. For example, for a 10 second cycle, the modulator modulates the laser light only for 8 seconds (sometimes referred to as, "the active portion"), but does not modulate the laser light for 2 seconds (sometimes referred to as, "the inactive portion"). By doing this, the LIDAR system may be able to reduce power consumption for the 2 seconds because the modulator does not have to provide a continuous signal.

In Frequency Modulated Continuous Wave (FMCW) LIDAR for automotive applications, it may be beneficial to operate the LIDAR system using quasi-CW modulation where FMCW measurement and signal processing methodologies are used, but the light signal is not in the on-state (e.g., enabled, powered, transmitting, etc.) all the time. In some implementations, Quasi-CW modulation can have a duty cycle that is equal to or greater than 1% and up to 50%. If the energy in the off-state (e.g., disabled, powered-down, etc.) can be expended during the actual measurement time then there may be a boost to signal-to-noise ratio (SNR) and/or a reduction in signal processing requirements to coherently integrate all the energy in the longer time scale.

FIG. 2 illustrates a LIDAR system 200, in accordance with implementations of the disclosure. LIDAR system 200 may be an example implementation of LIDAR sensor 136 (shown in FIG. 1A) and LIDAR system 104B (shown in FIG. 1B). LIDAR system 200 includes a laser 202, a splitter 204, a polarizer 206, and a transceiver 208, in accordance with implementations of the disclosure. Splitter 204 may be coupled to laser 202 to receive a transmit signal 210. Splitter 204 may split transmit signal 210 into transmit signals TX0-7 and local oscillator signals LO1 and LO2, according to an embodiment. Splitter 204 may be configured to provide transmit signal TX 0-7 and local oscillator signals LO1 and LO2 to transceiver 208 at a number of input ports 209. Alternatively, splitter 204 may be coupled to polarizer 206 and configured to provide a first local oscillator signal 224 and a second local oscillator signal 226, which polarizer 206 converts into an S-polarized local oscillator signal LO1 and a P-polarized local oscillator signal LO2, according to an implementation of the disclosure. In one implementation, local oscillator signals LO1 and LO2 share the same polarization orientation but are used in transceiver 208 to generate receive signals RXS0-7 and RXP0-7 from receive optical antennas configured to detect different polarizations.

In some implementations, transceiver 208 may be configured to receive input signals (e.g., transmit signals TX0-7 and local oscillator signals LO1 and LO2) and may be configured to generate output signals (e.g., receive signals RXS0-7 and RXP0-7) in response to the input signals. In one implementation, transceiver 208 is configured to operate using one transmit signal TX0 and one local oscillator signal LO1, for example. Transceiver 208 may include a local oscillator network 212 and a LIDAR pixel array 214 that are configured to support scanning and imaging operations of an autonomous vehicle environment.

In some implementations, local oscillator network 212 may be configured to receive one or both local oscillator signals LO1 and LO2 and may be configured to distribute one or both local oscillator signals LO1 and LO2 over a first local oscillator bus 216 and over a second local oscillator bus 218. First local oscillator bus 216 and second local oscillator bus 218 may include a number of waveguide channels coupled to provide local oscillator signals LO1 and LO2 to LIDAR pixel array 214. Local oscillator network 212 may be coupled to LIDAR pixel array 214 through one or both local oscillator buses 216 and 218.

LIDAR pixel array 214 may include a number of LIDAR pixels that may each be configured to emit a transmit beam and detect a return beam, in response to transmit signals TX0-7 and local oscillator signals LO1 and LO2, for example. LIDAR pixel array 214 may be configured to generate a number of receive signals RXS0-7 from a return beam having a first polarization. LIDAR pixel array 214 may be configured to generate receive signals RXP0-7 from a return beam having a second polarization orientation. LIDAR pixel array 214 may provide receive signals RXS0-7 on a first return signal bus 220 and may provide receive signals RXP0-7 on a second return signal bus 222. Transceiver 208 may be configured to provide receive signals RXS0-7 and RXP0-7 to a number of output ports 228. Receive signals RXS0-7 and RXP0-7 may be used by processing logic to generate image data and/or images representative of objects in a LIDAR operating environment, in accordance with implementations of the disclosure.

Although transceiver 208 is described in terms of eight transmit signals and 16 receive signals, it is to be understood that fewer (e.g., one or two) or more (e.g., hundreds or thousands) transmit or receive signals may be used, in accordance with various implementations of the disclosure.

Figure 3A:
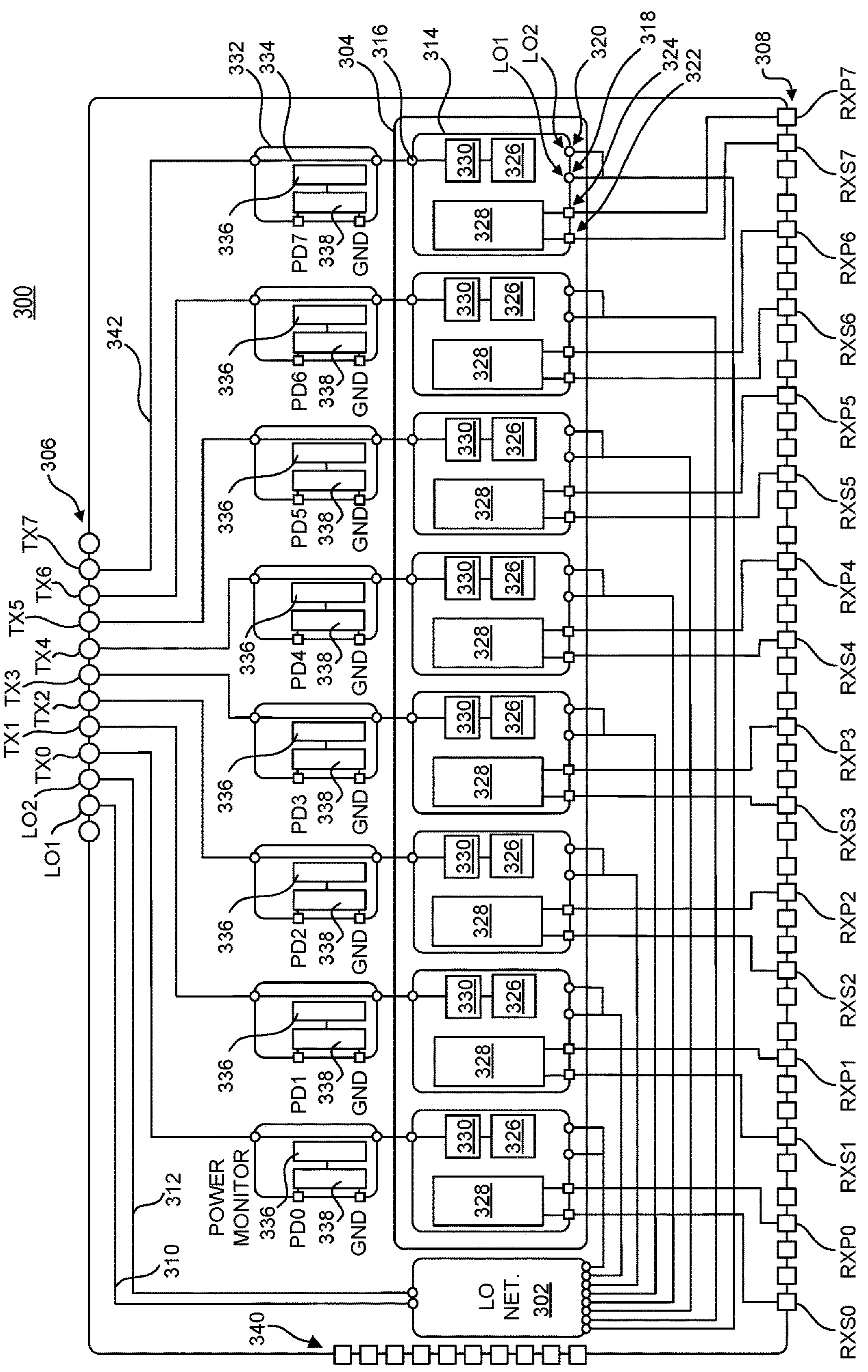
FIG. 3A illustrates a schematic diagram of a LIDAR transceiver having a local oscillator network and a LIDAR pixel array, in accordance with implementations of the disclosure.

FIG. 3A illustrates an example of a simplified schematic diagram of a LIDAR transceiver 300, in accordance with implementations of the disclosure. LIDAR transceiver 300 includes a local oscillator network 302 that is coupled to provide local oscillator signals to a LIDAR pixel array 304, according to an implementation of the disclosure.

In some implementations, local oscillator (LO) network 302 may be coupled one or more of a number of input ports 306 through waveguides 310 and 312 to receive one or both local oscillator signals LO1 and LO2. Local oscillator network 302 may be configured to provide local oscillator signals LO1 and LO2 to one or more LIDAR pixels of LIDAR pixel array 304, to enable the LIDAR pixels to generate receive signals RXS0-7 and RXP0-7 and provide the signals to a number of output ports 308, in accordance with implementations of the disclosure.

In some implementations, LIDAR pixel array 304 may include a number of LIDAR pixels positioned along one or two dimensions of the footprint of LIDAR transceiver 300. A LIDAR pixel 314 is an example of one or more of the LIDAR pixels of LIDAR pixel array 304, according to an implementation. LIDAR pixel 314 may receive a transmit signal on a port 316, may receive a local oscillator signal LO1 on a port 318, and may receive a local oscillator signal LO2 on a port 320, according to an implementation. LIDAR pixel 314 may be configured to generate a receive signal RXS and/or a receive signal RXP and may provide one or both of receive signal RXS and RXP to port 322 and port 324, respectively, in accordance with implementations of the disclosure. In one implementation, LIDAR pixel 314 receives a transmit signal, receives one local oscillator signal, and provides a single receive signal.

LIDAR pixel 314 may include an optical antenna array 326, receiver circuitry 328, and an optical rotator 330, according to an implementation of the disclosure. Optical antenna array 326 may include at least one transmit optical antenna configured to receive a transmit signal and emit a transmit beam into a LIDAR environment. Optical antenna array 326 may include a first receive optical antenna configured to detect a first polarization orientation of a return beam, may include a second receive optical antenna configured to detect a second polarization orientation of a return beam, or may include both the first receive optical antenna and the second receive optical antenna. The first polarization orientation may be orthogonal to the second polarization orientation. Receiver circuitry 328 may be configured to convert optical signals into the electrical signals, e.g., receive signal RXS and receive signal RXP. Receiver circuitry 328 may include one or more pairs of photodiodes configured to receive light and generate electrical signals in response to the received light. Optical rotator 330 may be positioned between optical antenna array 326 and receiver circuitry 328. Optical rotator 330 may be configured to provide the transmit signal to optical antenna array 326 and may be configured to provide return signals from return optical antennas to receiver circuitry 328 to support generation of receive signals RXS and RXP. Optical rotator 330 may be implemented as a polarized beam splitter within a waveguide but that is configured to operate as a rotator to provide transmit signals to the transmit antenna and to provide receive signals to receiver circuitry (e.g., optical mixers and/or photodiodes).

In some implementations, LIDAR transceiver 300 may include an array of power monitors configured to detect a quantity of power in each transmit signal provided to LIDAR pixels of LIDAR pixel array 304. The power monitor array may include one power monitor for each LIDAR pixel of LIDAR pixel array 304. Power monitor 332 may be an example of the power monitors of the power monitor array. Power monitor 332 may include a waveguide 334, a waveguide 336, and a photodiode 338. The transmit signal may propagate through waveguide 334, so waveguide 334 may be positioned in-line with transmit signal waveguides. Waveguide 336 may be positioned near waveguide 334 to receive a portion of the transmit signal. Photodiode 338 may be coupled to waveguide 336 and may be configured to convert a portion of the transmit signal into an electrical signal to support power monitoring operations. LIDAR transceiver 300 may include a number of output ports 340 that are communicatively coupled to the power monitors of the power monitor array and that are configured to provide power monitor outputs externally to LIDAR transceiver 300.

LIDAR transceiver 300 receives transmit signals (e.g., TX0, TX1, TX2, TX3, TX4, TX5, TX6, TX7, etc.) some of ports 306 that are coupled to LIDAR pixel array 304 through a number of waveguides (e.g., waveguide 342), according to an implementation. Although eight transmit signals (e.g., TX0-7) and 16 receive signals (receive signals RXS0-7 and RXP0-7) are illustrated, more or fewer transmit and receive signals may be implemented in LIDAR transceiver 300, according to various implementations of the disclosure.

Figure 3B:
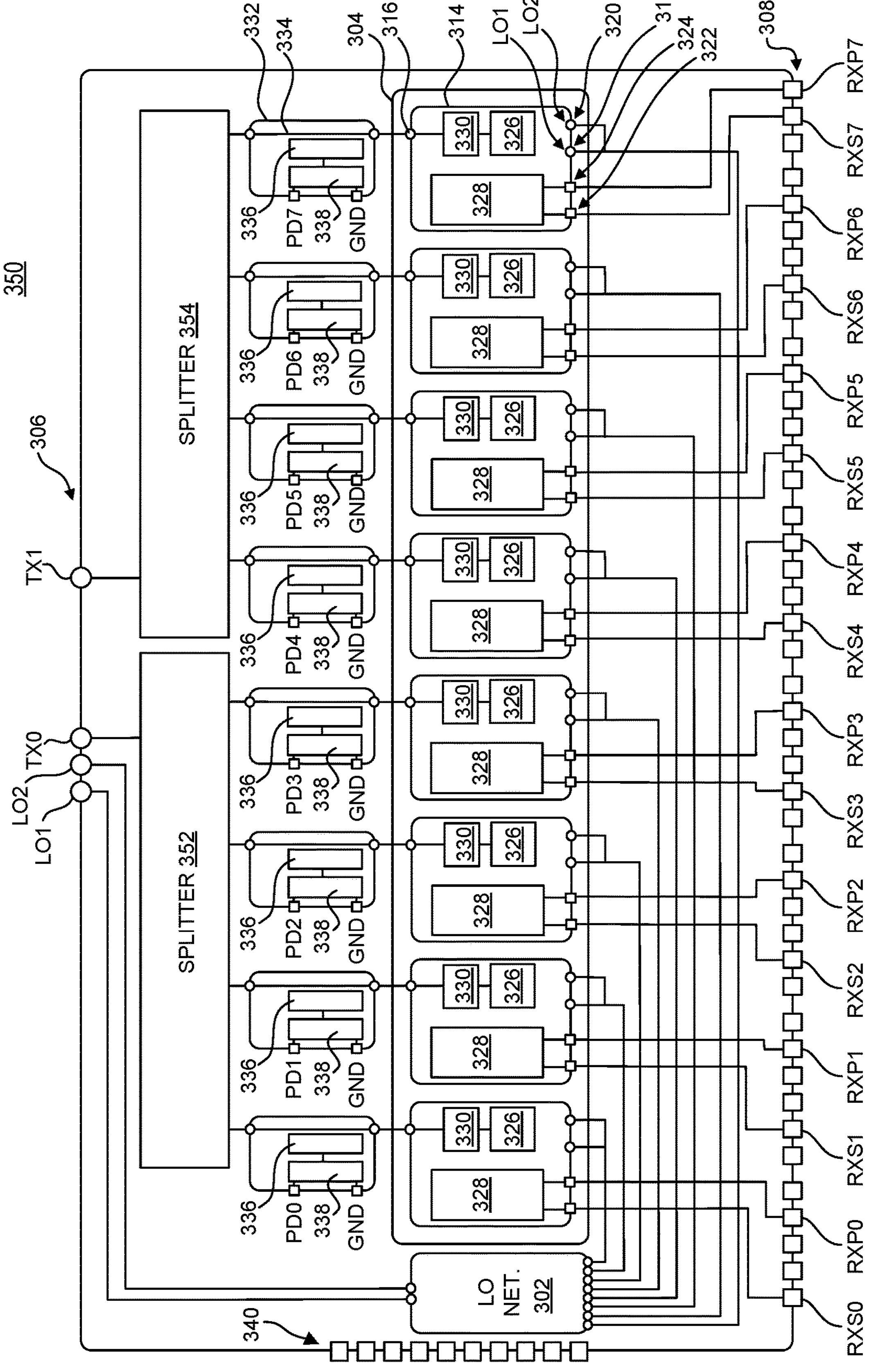
FIG. 3B illustrates a schematic diagram of a LIDAR transceiver having a local oscillator network and a LIDAR pixel array, in accordance with implementations of the disclosure.

FIG. 3B illustrates a LIDAR transceiver 350, in accordance with implementations of the disclosure. LIDAR transceiver 350 may include a splitter 352 and a splitter 354 configured to distribute transmit signals from input ports 306. Splitter 352 and splitter 354 may be implemented as passive splitters that include a number of optical splitters configured to receive one optical signal and divide the optical signal into several output ports (e.g., four ports), to support operation of LIDAR pixels of LIDAR pixel array 304. Splitters 352 and 354 may be 1-to-4 splitters or may be configured to split a transmit signal into many more signals (e.g., 8, 16, 32, 64, etc.), according to various implementations. Use of splitters 352 and 354 may reduce noise caused by cross-talk and may ease the burden associated with routing waveguides within LIDAR transceiver 350.

FIG. 4 illustrates a LIDAR system 400 including a LIDAR pixel 499, in accordance with implementations of the disclosure. LIDAR pixel 499 may include an optical antenna array 460, which may be an implementation of optical antenna array 326 (shown in FIGS. 3A and 3B). Optical antenna array 460 may include a transmit optical antenna 405, a receive optical antenna 410, a first coherent receiver 421 and a second coherent receiver 426. However, the present invention is not limited to the particular LIDAR pixel architecture shown in FIG. 4. Any suitable chip design architecture can be used to implement a LIDAR pixel. For example, transmit and receive optical antennas can be implemented as a single module or a single integrated chip or implemented as separate modules or chips. As another example, first and second coherent receivers can be implemented as a single module or a single integrated chip or implemented as separate modules or chips. Transmit optical antenna 405 can be configured to emit a transmit beam. The transmit beam may be an infrared transmit beam. The transmit beam may be a near-infrared transmit beam. The transmit beam may be a single defined polarization orientation. In FIG. 4, transmit optical antenna 405 is illustrated as a single-polarization output coupler and may transmit the transmit beam in response to receiving a transmit signal 401 by way of a waveguide 403, according to an implementation. Transmit signal 401 may be generated by a laser and the transmit beam emitted by transmit optical antenna 405 may have a very narrow linewidth (e.g., 1 nm or less).

In some implementations, receive optical antenna 410 can be a dual-polarization receive optical antenna configured to detect a first polarization orientation of a return beam and a second polarization orientation of the return beam. The return beam can be a reflection of the transmit beam reflecting off an object in an external environment of LIDAR system 400. The first polarization orientation may be orthogonal to the second polarization orientation. In some implementations, the orthogonality can have a margin rage above 0 to 10%. For example, if the first polarization orientation has a degree with reference to the second polarization orientation between 80 and 100 degrees, it can be defined as orthogonal. The first polarization orientation may be s-polarization, and the second polarization orientation may be p-polarization, or vice-versa. In FIG. 4, receive optical antenna 410 includes a first single-polarization grating coupler 411 and a second single-polarization grating coupler 416. First single-polarization grating coupler 411 can be configured to couple the first polarization orientation of the return beam to first coherent receiver 421 by way of waveguide 412. Second single-polarization grating coupler 416 can be configured to couple the second polarization orientation of the return beam to second coherent receiver 426 by way of waveguide 417. Transmit optical antenna 405 may emit the transmit beam with either the second polarization orientation, as illustrated, or may be configured to emit the transmit beam with the first polarization orientation.

First single-polarization grating coupler 411 may be rotated with respect to the second single-polarization grating coupler 416. In the particular illustrated implementation of FIG. 4, first single-polarization grating coupler 411 is rotated with respect to the second single-polarization grating coupler 416 by 90 degrees. The illustrated single-polarization output coupler of transmit optical antenna 405 may be rotated with respect to the first single-polarization grating coupler 411 and may include a similar orientation as second single-polarization grating coupler 416. In particular, first single-polarization grating coupler 411 may be rotated +45 degrees, transmit optical antenna 405 may be rotated −45 degrees, and second single-polarization grating coupler 416 may be rotated −45 degrees, according to an implementation.

In some implementations, transmit optical antenna 405, first single-polarization grating coupler 411, and second single-polarization grating coupler 416 may be positioned in a one-dimensional (1D) line to support receiving return beams (e.g., from a rotating mirror) that may impact optical antenna array 460 at locations offset from transmit optical antenna 405, e.g., due to the pitch-catch nature of transmitting and receiving LIDAR signals with a rotating mirror). For example, first single-polarization grating coupler 411 may be offset from transmit optical antenna 405 by a distance D1, and second single-polarization grating coupler 416 may be positioned between first single-polarization grating coupler 411 and transmit optical antenna 405. Second single-polarization grating coupler 416 may be offset in optical antenna array 460 by a second distance D2 from transmit optical antenna 405. First single-polarization grating coupler 411 may be offset from second single-polarization grating coupler 416 by a third distance D3.

In some implementations, first coherent receiver 421 may be configured to generate a first signal 423 in response to receiving the first polarization orientation of the return beam and a first local oscillator signal 431. The first local oscillator signal 431 may be an optical signal having the first polarization orientation and may be local oscillator signal LO1. In FIG. 4, the first polarization orientation of the return beam may be received by first coherent receiver 421 from first single-polarization grating coupler 411 by way of waveguide 412, and first local oscillator signal 431 may be received by first coherent receiver 421 by way of waveguide 432. First signal 423 may be an electrical signal provided to processing logic 450 by way of communication channel 422.

In some implementations, first coherent receiver 421 may include an optical mixer 462 and photodiode pair 464 for converting the received optical signal into an electrical signal. Optical mixer 462 may be coupled to receive local oscillator signal LO1 and the signal representing the first polarization orientation of the return beam from first single-polarization grating coupler 411. Optical mixer 462 may be coupled to photodiode pair 464 to provide a mixed output signal. Photodiode pair 464 may be configured to generate first signal 423 and provide first signal 423 to processing logic 450 by way of communication channel 422. First signal 423 may be an example of receive signal RXS (e.g., shown in FIGS. 3A and 3B). The number of output signals from an optical mixer can be any suitable number, not limited to a particular number.

In some implementations, second coherent receiver 426 can be configured to generate a second signal 428 in response to receiving the second polarization orientation of the return beam and a second local oscillator signal 436. The second local oscillator signal 436 may be an optical signal having the second polarization orientation and may be local oscillator signal LO2. In FIG. 4, the second polarization orientation of the return beam can be received by second coherent receiver 426 from second single-polarization grating coupler 416 by way of waveguide 417, and second local oscillator signal 436 is received by second coherent receiver 426 by way of waveguide 437. Second signal 428 may be an electrical signal provided to processing logic 450 by way of communication channel 427.

In some implementations, second coherent receiver 426 may include an optical mixer 466 and photodiode pair 468 for converting the received optical signal into an electrical signal. Optical mixer 466 may be coupled to receive local oscillator signal LO2 and the signal representing the second polarization orientation of the return beam from second single-polarization grating coupler 416. Optical mixer 466 may be coupled to photodiode pair 468 to provide a mixed output signal. Photodiode pair 468 may be configured to generate second signal 428 and provide second signal 428 to processing logic 450 by way of communication channel 427. Second signal 428 may be an example of receive signal RXP (e.g., shown in FIGS. 3A and 3B). The number of output signals from an optical mixer can be any suitable number, not limited to a particular number.

In some embodiments, the received optical signals, the transmit signal (prior to emission), and the local oscillator signals may have the same polarization orientation while on-chip (e.g., while propagating through waveguides). One or more of the optical antennae may be configured to change the polarization orientation (e.g., the rotation) of the return beam and of the transmit beam to be one or more specific polarization orientations. For example, an optical antenna may be configured to convert a return beam having a first polarization orientation into a waveguide as a return signal having a second or third polarization orientation. As another example, a transmit signal may have a third orientation while in a waveguide and an optical antenna may be configured to couple the transmit signal into free-space as a transmit beam having a first or second polarization orientation.

Processing logic 450 can be configured to generate an image 455 in response to receiving first signal 423 and second signal 428 from first coherent receiver 421 and second coherent receiver 426, respectively. LIDAR system 400 may include an array of LIDAR pixels 499 that are configured to provide first signals (e.g., signal 423) and second signals (e.g. signal 428) to processing logic 450. In this context, processing logic 450 may generate image 455 in response to the first signal and second signals received by processing logic 450 by the plurality of LIDAR pixels 499 in the array of LIDAR pixels.

In an example of operation, transmit signal 401 may be emitted into free space as the transmit beam by transmit optical antenna 405. The transmit beam may propagate through one or more lenses and be deflected by a rotating mirror, and then propagate through the external environment until encountering an object. A portion of the transmit beam that encounters the object may be reflected back toward LIDAR system 400 and LIDAR pixel 499 as the return beam. The return beam may reflect off the rotating mirror and propagate through the one or more lenses but be offset relative to transmit optical antenna 405 due to the time difference in the rotation of the mirror. To compensate for this offset, components of receive optical antenna 410 may be offset from transmit optical antenna 405.

Figure 5A:
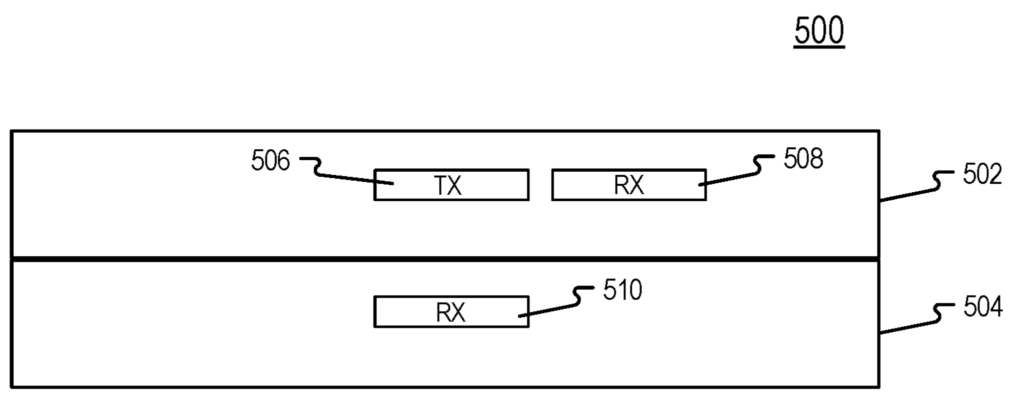
FIGS. 5A and 5B illustrate block diagrams of a stacked configuration of optical antennas for a LIDAR device, in accordance with implementations of the disclosure.
Figure 5B:
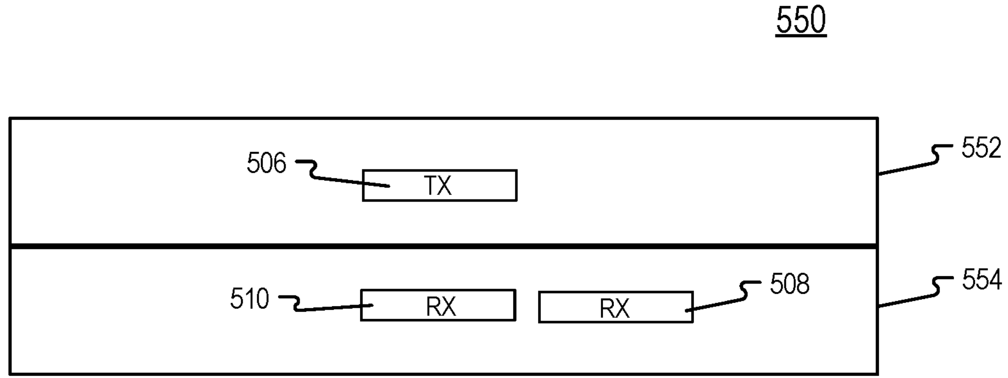

FIGS. 5A and 5B illustrate simplified block diagrams of LIDAR devices having stacked antenna configurations, in accordance with implementations of the disclosure. FIG. 5A illustrates an example of a LIDAR device 500 having a first semiconductor layer 502 stacked on top of a second semiconductor layer 504. LIDAR device 500 may include a transmit optical antenna 506 and a receive optical antenna 508. Transmit optical antenna 506 is an example implementation of transmit optical antenna 405 (shown in FIG. 4) and may be configured to emit a transmit beam having a second polarization orientation. Receive optical antenna 508 may be an example implementation of second single-polarization grating coupler 416 (shown in FIG. 4) and may be configured to detect a return beam having a second polarization orientation. Second semiconductor layer 504 includes a second receive optical antenna 510 that may be an example implementation of first single-polarization grating coupler 411 (shown in FIG. 4) and that may be configured to detect a return beam having a first polarization orientation. Receive optical antenna 508 may be offset from transmit optical antenna 506 and may be positioned in a first semiconductor layer that is stacked on top of a second semiconductor layer. First semiconductor layer 502 may be an alloy formed from one or more of group III or group V elements from the periodic table. Second semiconductor layer 504 may be formed from silicon substrate or from nitride.

FIG. 5B illustrates an example of a LIDAR device 550 having a first semiconductor layer 552 stacked on top of a second semiconductor layer 554 and configured to provide stacked optical antenna LIDAR operations, in accordance with implementations of the disclosure. First semiconductor layer 552 may include transmit optical antenna 506, and second semiconductor layer 554 may include receive optical antenna 508 and receive optical antenna 510 offset from each other and positioned to receive a LIDAR return beam through first semiconductor layer 552, in accordance with implementations of the disclosure.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), $I^2C$ (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A light detection and ranging (LIDAR) device comprising:

a local oscillator network configured to provide a plurality of local oscillator signals including a first local oscillator signal and a second local oscillator signal in the LIDAR device; and one or more LIDAR pixels coupled to the local oscillator network, wherein at least one of the one or more LIDAR pixels includes:

a transmit optical antenna configured to emit a transmit beam;

a receive optical antenna configured to detect (i) a first polarization orientation of a return beam and (ii) a second polarization orientation of the return beam; and at least one receiver configured to generate at least one signal based on (i) the return beam and (ii) at least one of the plurality of local oscillator signals, wherein the at least one signal represents a distance to an object;

wherein the local oscillator network comprises: a plurality of optical splitters positioned outside the one or more LIDAR pixels, and a plurality of output ports configured to provide the first local oscillator signal and the second local oscillator signal to each of the one or more LIDAR pixels.

2. The LIDAR device of claim 1, wherein the at least one of the plurality of local oscillator signals includes a first local oscillator signal and a second local oscillator signal, wherein the at least one receiver includes a first receiver configured to receive the first local oscillator signal, wherein the at least one receiver includes a second receiver configured to receive the second local oscillator signal.

3. The LIDAR device of claim 2, wherein the first local oscillator signal has the first polarization orientation and the second local oscillator signal has the second polarization orientation.

4. The LIDAR device of claim 2, wherein the at least one signal includes a first signal and a second signal, wherein the first receiver is configured to generate the first signal representing the return beam of the first polarization orientation, wherein the second receiver is configured to generate the second signal representing the return beam of the second polarization orientation.

5. The LIDAR device of claim 4, wherein the first receiver includes a first optical mixer and a first diode pair configured to generate the first signal, wherein the second receiver includes a second optical mixer and a second diode pair configured to generate the second signal, wherein the first signal and the second signal are electrical signals.

6. The LIDAR device of claim 1, wherein the receive optical antenna includes:
- a first single-polarization grating coupler configured to couple the first polarization orientation of the return beam to the at least one receiver; and
- a second single-polarization grating coupler configured to couple the second polarization orientation of the return beam to the at least one receiver.

7. The LIDAR device of claim 6, wherein the transmit optical antenna includes a third single-polarization grating coupler configured to emit the transmit beam with the first polarization orientation, wherein the first single-polarization grating coupler is offset from the second single-polarization grating coupler, wherein the second single-polarization grating coupler is offset from the third single-polarization grating coupler.

8. The LIDAR device of claim 7, wherein the first single-polarization grating coupler is rotated by approximately 90 degrees with respect to the second single-polarization grating coupler.

9. The LIDAR device of claim 1, wherein a particular number of the plurality of output ports of the local oscillator network is provided to correspond with the particular number of the one or more LIDAR pixels.

10. The LIDAR device of claim 1, wherein each of the one or more LIDAR pixels includes a port for receiving the transmit beam, a port for receiving the first local oscillator signal, and a port for receiving the second local oscillator signal.

11. The LIDAR device of claim 1 further comprising:
- at least one passive splitter configured to couple a transmit signal to at least two of the one or more LIDAR pixels.

12. The LIDAR device of claim 1 further comprising:
- a plurality of power monitors, wherein one of the plurality of power monitors is coupled to the transmit optical antenna, wherein the one of the plurality of power monitors includes at least one photodiode configured to generate an electrical output signal representative of a quantity of power of a transmit signal.

13. The LIDAR device of claim 1, wherein the at least one of the plurality of LIDAR pixels further includes an optical rotator configured to couple a transmit signal to the transmit optical antenna.

14. The LIDAR device of claim 1, wherein the transmit optical antenna is positioned in a first semiconductor layer, wherein the receive optical antenna is positioned in a second semiconductor layer that is stacked below the first semiconductor layer.

15. The LIDAR device of claim 14, wherein the first semiconductor layer includes a group III or a group V element, wherein the second semiconductor layer is a nitride layer.

16. The LIDAR device of claim 1, wherein the first polarization orientation is orthogonal to the second polarization orientation.

17. An autonomous vehicle control system for an autonomous vehicle, the autonomous vehicle control system comprising:
- a light detection and ranging (LIDAR) device including:
  - a local oscillator network configured to provide a plurality of local oscillator signals including a first local oscillator signal and a second local oscillator signal in the LIDAR device; and
  - one or more LIDAR pixels coupled to the local oscillator network, wherein at least one of the one or more LIDAR pixels includes:
    - a transmit optical antenna configured to emit a transmit beam;
    - a receive optical antenna configured to detect (i) a first polarization orientation of a return beam and (ii) a second polarization orientation of the return beam; and
    - at least one receiver configured to generate at least one signal based on (i) the return beam and (ii) at least one of the plurality of local oscillator signals, wherein the at least one signal represents a distance to an object;
- wherein the local oscillator network comprises: a plurality of optical splitters positioned outside the one or more LIDAR pixels, and a plurality of output ports configured to provide the first local oscillator signal and the second local oscillator signal to each of the one or more LIDAR pixels.

18. The autonomous vehicle control system of claim 17, wherein the receive optical antenna includes:
- a first single-polarization grating coupler configured to couple the first polarization orientation of the return beam to the at least one receiver; and
- a second single-polarization grating coupler configured to couple the second polarization orientation of the return beam to the at least one receiver.

19. The autonomous vehicle control system of claim 17, wherein the transmit optical antenna is positioned in a first semiconductor layer, wherein the receive optical antenna is positioned in a second semiconductor layer that is stacked below the first semiconductor layer.

20. An autonomous vehicle comprising:
- a light detection and ranging (LIDAR) device including:
  - a local oscillator network configured to provide a plurality of local oscillator signals including a first local oscillator signal and a second local oscillator signal in the LIDAR device; and
  - one or more LIDAR pixels coupled to the local oscillator network, wherein at least one of the one or more LIDAR pixels includes:
    - a transmit optical antenna configured to emit a transmit beam;
    - a receive optical antenna configured to detect (i) a first polarization orientation of a return beam and (ii) a second polarization orientation of the return beam; and
    - at least one receiver configured to generate at least one signal based on (i) the return beam and (ii) at least one of the plurality of local oscillator signals, wherein the at least one signal represents a distance to an object;

wherein the local oscillator network comprises: a plurality of optical splitters positioned outside the one or more LIDAR pixels, and a plurality of output ports configured to provide the first local oscillator signal and the second local oscillator signal to each of the one or more LIDAR pixels.

* * * * *